United States Patent [19]

Sheppard et al.

[11] Patent Number: 4,546,091

[45] Date of Patent: Oct. 8, 1985

[54] CATALYSTS

[75] Inventors: Christine M. Sheppard, London; David C. Puxley, Beckenham; Reginald G. S. Banks, Solihull; Donald McKenzie, London, all of England

[73] Assignee: British Gas Corporation, London, England

[21] Appl. No.: 608,854

[22] Filed: May 10, 1984

[30] Foreign Application Priority Data

May 12, 1983 [GB] United Kingdom ............... 8313123

[51] Int. Cl.[4] ............................................. B01J 21/16
[52] U.S. Cl. ...................................................... 502/84
[58] Field of Search .......................................... 502/84

[56] References Cited

U.S. PATENT DOCUMENTS

| | | | |
|---|---|---|---|
| 3,932,534 | 1/1976 | Fukunaga et al. | 260/618 |
| 4,046,869 | 9/1977 | Dorawala et al. | 423/652 |
| 4,185,967 | 1/1980 | Komodromos et al. | 48/214 |
| 4,216,123 | 8/1980 | Banks et al. | 252/466 J |
| 4,250,060 | 2/1981 | Banks et al. | 252/466 J |

FOREIGN PATENT DOCUMENTS

| | | |
|---|---|---|
| 2461482 | 8/1976 | Fed. Rep. of Germany . |
| 1068809 | 5/1967 | United Kingdom . |
| 1206131 | 9/1970 | United Kingdom . |
| 1336866 | 11/1973 | United Kingdom . |
| 1462060 | 1/1977 | United Kingdom . |
| 1509557 | 5/1978 | United Kingdom . |
| 1561629 | 2/1980 | United Kingdom . |
| 1573706 | 8/1980 | United Kingdom . |

*Primary Examiner*—Carl F. Dees
*Attorney, Agent, or Firm*—Lalos, Leeds, Keegan, Marsh, Bentzen & Kaye

[57] ABSTRACT

A catalyst composition, suitable for steam reforming or methanation reactions, comprising a Feitknecht compound intermixed with or interstratified with and bonded with phyllosilicate layers of a clay mineral such as kaolin or benotonite. Conventional catalyst formulations can be modified so as produced catalysts have good dispersion of the catalytic sites.

15 Claims, No Drawings

CATALYSTS

This invention relates to catalysts, and more particularly to catalysts which are useful for steam reforming and methanation reactions in the production of substitute natural gas from hydrocarbons or from synthesis gases derived from hydrocarbons.

With the advent of high pressure coal gasification processes, there is a need for catalysts which are sufficiently active and robust to enable the coal synthesis gases to be methanated efficiently. Under modern ash-slagging gasification conditions, synthesis gases are produced which contain no large excess of steam and which are amenable to combined CO shift-methanation reactions to produce methane containing gases. Catalysts used in these methanations have not only to be sufficiently active, but also have to be robust enough to function without the benefit of a large excess of steam.

The use of clay minerals as supports or binders for catalysts to improve their mechanical strength is known. However, there are physical limits on the relationship between the catalytically active components and the support and, hitherto, such supported catalysts have had low catalytic activity due to insufficient concentration of the catalytically active material. For example, U.S. Pat. No. 4,046,869, discloses catalyst compositions in which, in one embodiment, a support, which may be a clay, is impregnated with an aqueous solution of the active catalyst, which could include a Group VIII such as nickel, and the impregnated supported is then dried and calcined. The active catalytic metal content of such catalysts is typically about 30% by weight (expressed as the oxide) of the total weight of catalyst. Such impregnated catalysts are not stable to sintering.

In order to increase the catalytic activity and thermal stability of the catalyst material, self supporting catalysts have been developed wherein a catalytic metal such as Group VIII metal eg. nickel is coprecipitated from solution along with a support material such as alumina, which was copresent with the nickel in the solution as a soluble aluminium salt to form Feitknecht Compounds. Such catalysts have been highly developed for gasification purposes and are described for example in U.S. Pat. Nos. 4,250,060, 4,216,123 and 4,185,967.

In UK Patent Specification No. 1561629 there are described catalyst compositions comprising divalent metals such as those from Groups I, II and VIII together with a metal from Group VI, especially tungsten or molybdenum, an aluminium compound selected from alpha, delta or theta alumina or the hydrated alumina pseudo-boehmite and clays. Coprecipitation techniques are described for forming a divalent metal-pseudo-boehmite component, but this coprecipitation is not carried out either in the presence of the Group VI metal or in the presence of the clay. These are incorporated at later stages.

We have now found that clay modified coprecipitated catalyst compositions can be produced which are useful in steam reforming and methanation application and which can also be employed as precursors for other catalyst systems.

The present invention provides a catalyst composition comprising Feitknecht compounds intermixed with a clay mineral, said Feitknecht compound having the general formula:

$$Me^{2+}{}_xMe^{3+}{}_y(OH)_{2x+3y-2z}(A^{2-})_z \cdot nH_2O$$

wherein $Me^{2+}$ is a divalent metal cation $Me^{3+}$ is a trivalent metal cation, $A^{2-}$ is either a single divalent anion or two monovalent anions and the ratio of $x/y$ is between 1.5/1 to 4/1.

$Me^{2+}$ may be a Group VIII ion such as iron (II), cobalt (II), nickel (II), a Group VIIb metal such as manganese (II), a Group II metal such as zinc or magnesium, or a divalent metal of Group I such as copper (II). $Me^{3+}$ may be a of Group VIII metal such as iron (III), a Group VI metal such as chromium (III) or a Group III metal such as aluminium. A typical Feitknecht compound has the formula $Ni_6Al_2(OH)_{16}(CO_3)4H_2O$.

It is not essential that either $Me^{2+}$ or $Me^{3+}$ be a single cation species. Mixed metals may be used, for example $Me^{2+}$ may be a mixture of nickel (II) and magnesium ions and $Me^{3+}$ may be a mixture of aluminium and chromium (III) ions. Although it is preferred that at least one of $Me^{2+}$ or $Me^{3+}$ is a transition metal, and nickel is especially preferred, other metal catalyst systems for example those used for methanol production using copper (II)/aluminium and copper (II)-zinc-/aluminium hydroxycarbonates based catalysts may also be encompassed by the clay-based catalysts of the present invention. The catalysts of the invention have particular application in steam-reforming and methanation reactions.

Typical anions $(A^{2-})$ would include the anions $CO_3{}^{2-}$ $(HCO_3{}^-)_2 SO_4{}^{2-}$, $(NO_3{}^-)_2$, $(Cl^-)_2$ and $(Br^-)_2$.

The Feitknecht compounds, which are catalyst precursors, are double layer hydroxy-carbonates, for example, and contain brucite-type layers, wherein the divalent and trivalent cations are octahedrally coordinated, interlayered with the anions, hydroxyl ions and water molecules.

The clays employed in the catalysts of the invention contain phyllosilicate layers. The phyllosilicates may differ in their internal structure, but each layer is an integral internally bonded structure, the outer basal surfaces of which comprise oxygen or hydroxyl ions in a quasi-hexagonal array. Suitable clays would include kaolins and smectites such as bentonite as well as other smectite clays.

Although the internal bonding of each layer of the clays is strong, the interlayer bonding is weak, and because of the structural similarity between the brucite-like layers of the Feitknecht compounds and phyllosilicate layers of the clays, if the Feitknecht compound is being produced (eg. by coprecipitation from mixed solution) in the presence of the clay, the phyllosilicate layers of the clay will form interlayers with the layers of the Feitknecht compound.

The catalysts of the present invention are distinguished from the prior art in that the clay is incorporated prior to the precipitation stage where according to prior art teachings clay is added only when the catalyst precursor is formed.

In the present invention the alkaline solution has a dual role. Not only does it act as precipitating agent as described in U.S. Pat. Nos. 4,250,060, 4,216,123 and 4,185,967, it is also the agent for dispersing the clay material prior to precipitation.

The effect of adding the clay prior to precipitation is to modify the nature of the Feitknecht Compound that is the catalyst precursor. This may be done in two ways depending upon the structure of clay material used and the precise conditions of precipitation. The effect may be purely physical; by dispersing the clay in the alkali first, the intimacy of mixing of the Feitknecht Compound and the clay is greatly increased, compared to clay addition after precipitation. This type of physical interaction occurs in kaolin-based catalysts.

Other clays may show a further interaction with the Feitknecht Compound by interstratification of their layer structures with those of the Feitknecht Compound. Swelling clays such as bentonites are the most prone to show this additional structural interaction.

Furthermore, because of similarities of structure, the bonding capacities will also be similar. Thus, the clay modified catalyst where interstatification occurs is not a physical mixture, but rather is an integral composition in which all the layers are structurally bonded to adjacent layers.

The effect of interposing phyllosilicate layers is to separate the cation-containing layers from each other. Since these layers are precursors to the active catalytic sites, by separating them, they are dispersed through a greater catalyst mass and will give a higher activity than if they were concentrated to fewer, but larger sites.

The catalysts of the present invention may be prepared in accordance with any of the known techniques for preparing Feitknecht compounds eg. those described in U.S. Pat. Nos. 4,250,060, 4,216,123 and 4,185,967, except, of course, the coprecipitation has to be carried out in the presence of well-dispersed clay minerals. The dispersion of the clay minerals is effected by adding them to the alkali solution before precipitation.

After precipitation, the clay-modified precursor is decomposed by calcination to give the oxide form. The precursor may be shaped prior to or after calcination, according to known techniques, and the catalyst may be reduced to its active form in the same way as any other coprecipitated catalyst.

The catalyst compositions of the present invention may be used in steam-reforming, methanation or methanol synthesis applications.

In precursor form the catalysts of the present invention may be used in conjunction with other support materials such as metal or alumina monoliths to form catalysts of high mechanical strength.

The invention will be illustrated by the following Examples:

| Components | | Example No. 1 | Example No. 2 | Example No. 3 |
|---|---|---|---|---|
| Component I | | | | |
| Nickel Nitrate | (gm) | 582 | 582 | 582 |
| Aluminium Nitrate | (gm) | 225 | 225 | 250 |
| Chromium Nitrate | (gm) | 26.2 | 26.2 | — |
| Water | (liter) | 2.0 | 2.0 | 2.0 |
| Component II | | | | |
| Sodium Carbonate | (gm) | 420 | 420 | 420 |
| Fuller's Earth | (gm) | 40 | — | — |
| Bentonite | (gm) | — | 113 | — |
| Kaolin | (gm) | — | — | 240 |
| Water | (liter) | 1.5 | 1.5 | 1.5 |

PREPARATION

In each example Component II is prepared by dispersing the clay in a solution of the sodium and thereafter heating the dispersion to 92° C. Component I is prepared by disolving the nitrates in the water and heating the whole to 92° C.

Precipitation is effected, in each case, by combining Component II with Component I and boiling for 15 minutes. The precursor slurry is filtered, re-slurried with 3 liters of distilled water and filtered again. This washing stage, re-slurrying and filtering was repeated until the pH of the filtrate was neutral.

The residue was then dried for 24 hours at 120° C. ground to a powder of a particle size of less than 850 microns, and calcined in air at 450° C. for 2 hours.

The calcined precursor was worked up into a catalyst material by mixing with 2% graphite followed by pelleting.

We claim:

1. A catalyst composition comprising interstratified layers of a coprecipitated Feitknecht compound and a clay mineral containing phyllosilicate layers, said Feitknecht compound having the general formula:

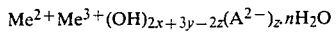

$$Me^{2+}Me^{3+}(OH)_{2x+3y-2z}(A^{2-})_z \cdot nH_2O$$

wherein $Me^{2+}$ is a divalent metal cation; $Me^{3+}$ is trivalent metal cation; $A^{2-}$ is either a single divalent anion or two monovalent anions, and the ratio of x/y is between 1.5/1 to 4/1.

2. A catalyst as claimed in claim 1 wherein $Me^{2+}$ and $Me^{3+}$ each comprise one or more metal species.

3. A catalyst as claimed in claim 2 in which $Me^{2+}$ is a transition metal.

4. A catalyst as claimed in claim 1, 2 or 3 in which $Me^{2+}$ is nickel (II) and/or magnesium and $Me^{3+}$ is aluminium or chromium (III).

5. A catalyst as claimed in claim 1, 2 or 3 in which $A^{2-}$ is the carbonate ion or two hydrogen carbonate ions.

6. A catalyst as claimed in claim 1, 2 or 3 in which the clay is a Smectite.

7. A catalyst as claimed in claim 6 in which the clay is bentonite.

8. A catalyst as claimed in claims 1, 2 or 3 in which the clay is a kaolin.

9. A catalyst composition as set forth in claim 1 wherein $Me^{2+}$ is a divalent ion selected from the group consisting of divalent ions of Group VIII, VIIb, II and I metals and mixtures thereof.

10. A catalyst composition as set forth in claim 1 where $Me^{3+}$ is a trivalent ion selected from the group consisting of trivalent ions of Group VIII, VI and II metals and mixtures thereof.

11. A catalyst composition as set forth in claim 9 where $Me^{3+}$ is a trivalent ion selected from the group consisting of trivalent ions of Group VIII, VI and II metals and mixtures thereof.

12. A catalyst composition as set forth in claim 11 where said Feitknecht compound is $Ni_6Al_2(OH)_{16}(CO_3) \cdot 4H_2O$.

13. A catalyst composition as set forth in claim 11 wherein at least one of $Me^{2+}$ and $Me^{3+}$ is a transition metal.

14. A catalyst composition as set forth in claim 1 where $A^{2-}$ is an anion selected from the group consisting of $CO_3^-$, $(HCO_3^-)_2$, $SO_4$, $(NO_3^-)_2$, $(Cl^-)_2$ and $(Br^-)_2$.

15. A catalyst composition as set forth in claim 11 where $A^{2-}$ is an anion selected from the group consisting of $CO_3^-$, $(HCO_3^-)_2$, $SO_4$, $(NO_3^-)_2$, $(Cl^-)_2$ and $(Br^-)_2$.

* * * * *